US007584659B1

(12) United States Patent
Rogers et al.

(10) Patent No.: US 7,584,659 B1
(45) Date of Patent: Sep. 8, 2009

(54) WHEEL BALANCER WITH WEIGHT APPLICATION ERROR CORRECTION SYSTEM

(75) Inventors: Frederick J. Rogers, Maumelle, AR (US); Steve Serio, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 200 days.

(21) Appl. No.: 11/592,167

(22) Filed: Nov. 3, 2006

(51) Int. Cl.
*G01M 1/38* (2006.01)

(52) U.S. Cl. ........................................ 73/462; 301/5.21

(58) Field of Classification Search ................ 73/462; 301/5.21; 700/279; 702/56
See application file for complete search history.

(56) References Cited

U.S. PATENT DOCUMENTS 4,926,341 A * 5/1990 Guyot ........................ 700/279
5,412,583 A * 5/1995 Cameron et al. ............ 700/279
5,544,073 A * 8/1996 Piety et al. .................. 700/279
5,915,274 A * 6/1999 Douglas ....................... 73/462
6,484,574 B1 * 11/2002 Douglas et al. .............. 73/462

* cited by examiner

*Primary Examiner*—John E Chapman
(74) *Attorney, Agent, or Firm*—McDermott Will & Emery LLP

(57) ABSTRACT

A wheel balancing system may include a wheel imbalance measuring system, a memory system, a user interface, and a processing system. The processing system may be configured to cause initial imbalance information relating to an initial imbalance in a wheel assembly that was measured by the wheel imbalance measuring system to be stored in the memory system. The processing system may also be configured to recall the initial imbalance information from the memory system after a residual imbalance measurement of the wheel assembly by the wheel imbalance measuring system. The processing system may also be configured to cause the user interface to communicate weight information to the user about an amount and placement location of at least one weight needed to correct for the imbalance based on the initial imbalance information recalled from the memory system.

17 Claims, 2 Drawing Sheets

WHEEL BALANCER WITH WEIGHT APPLICATION ERROR CORRECTION SYSTEM

BACKGROUND

1. Technical Field

This application relates to wheel balancing systems.

2. Description of Related Art

Wheel balancing systems are commonly used when balancing wheel assemblies. Some measure an imbalance in the wheel assembly and provide information about the amount and placement location of one or more weights that should correct for the imbalance.

The operator may install the specified weights at the specified locations. The wheel balancing system may then again be used to verify that the wheel assembly has been balanced.

Sometimes, the operator will make a mistake and place one or more weights in the wrong location and/or use an incorrect amount for a weight. When this happens, the wheel balancing system may indicate that the wheel assembly is still out of balance.

The operator may ask the wheel balancing system to specify the amount and placement location of one or more additional weights that may be needed to bring the wheel assembly into balance. These additional weights may then be installed, following which a further check may be made. If the wheel assembly is still out of balance due to a second error in weight placement or selection, the wheel balancing system may suggest that a new supplemental set of weights be installed. This process of "chasing weights" may continue until the wheel assembly is balanced or the operator abandons the balancing effort.

"Chasing weights" can result in an excessive number of weights being installed. This may increase the chance of an installed weight dislodging during use and thus the wheel assembly becoming unbalanced. "Chasing weights" can also consume substantial time. The operator may also quit before the process is complete, resulting in an unbalanced wheel.

When a check indicates that a wheel assembly is still out of balance, the operator may instead remove the weights that were installed and restart the balancing process from the beginning. This may also consume substantial time. If the operator continues to make selection or installation errors, it may also lead to the operator abandoning the balancing effort before the wheel assembly is balanced.

An operator's inability to quickly balance a wheel assembly may also lead the operator to erroneously conclude that the problem is a defect in the wheel balancing system, not errors in the operator's efforts. This can cause unjustified distrust of the wheel balancing system and/or needless but costly attempts at repairing it.

SUMMARY

A wheel balancing system may include a wheel imbalance measuring system, a memory system, a user interface, and a processing system.

The processing system may be configured to cause initial imbalance information relating to an initial imbalance in a wheel assembly that was measured by the wheel imbalance measuring system to be stored in the memory system.

The processing system may be configured to recall the initial imbalance information from the memory system after a residual imbalance measurement of the wheel assembly by the wheel imbalance measuring system.

The processing system may be configured to cause the user interface to communicate weight information to the user about an amount and placement location of at least one weight needed to correct for the residual imbalance based on the imbalance information recalled from the memory system.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings illustrate several embodiments and, together with the description, serve to explain principles of the present disclosure.

DETAILED DESCRIPTION OF ILLUSTRATIVE EMBODIMENTS

Various components and sub-components of illustrative wheel balancing systems will now be described in connection with a discussion of FIGS. 1 and 2, followed by examples of methods that they may collectively perform in connection with a discussion of FIG. 3.

Figure 1:
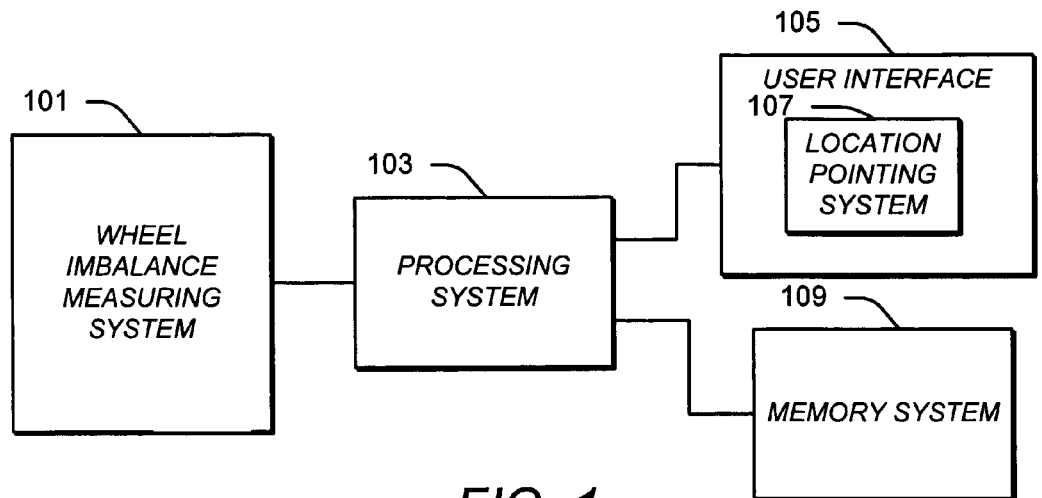
FIG. 1 is a block diagram of components in a wheel balancing system.

FIG. 1 is a block diagram of components in a wheel balancing system. As shown in FIG. 1, the wheel balancing system may have a wheel imbalance measuring system 101, a processing system 103, a user interface 105, a location pointing system 107 that may be part of the user interface 105, and a memory system 109.

The user interface 105 may be configured to communicate information to and from a user relating to a balancing process. For example, it may be configured to receive information indicative of locations on a wheel assembly at which weights may be placed, including information about the diameter and/or width of the wheel rim. The location information may specify whether weights may only be placed in a single plane, such as in the interior or exterior plane of the wheel, or whether weights may be placed in two planes, such as in both the interior and exterior planes of the wheel.

The user interface 105 may include any type of device or devices to receive information, such as a keyboard, mouse, or touch screen or any combination of them. Information may in addition or instead come from another system.

The user interface 105 may in addition or instead use a parameter entry arm to receive information. The arm may include a pointer which the user physically touches to one or more locations on the wheel assembly that may receive weights, such as to the interior and/or exterior rim of the wheel assembly. One or more sensors may be associated with the parameter entry arm and configured to sense these locations. Information about the wheel assembly, such as the diameter of the rim and the spacing between its interior and exterior planes, may be extracted from this sensed information.

Needed information about the wheel assembly may also or instead be gathered in a more fully automated way through the use of one or more scanners, such as one or more CCD cameras, lasers, light sensors, mechanical sensors, etc. For example, a scanner may be configured to scan the wheel assembly and to extract information from the scan from which the diameter of the rim and the spacing between its interior and exterior planes may be computed.

Other technologies may be used in addition or instead as part of the user interface 105 to receive needed information about the wheel assembly.

The user interface 105 may also be configured to communicate information to the user, such as information about the amount and location of one or more weights that need to be installed on the wheel assembly in order to eliminate or at least substantially reduce any detected imbalance. The user interface 105 may employ any type of device or devices to provide this information, such as one or more displays, numerical readouts, and/or sound systems.

The location pointing system 107 may be used as part of the user interface 105 to assists a user in locating one or more points on the wheel assembly at which one or more weights should be installed. Examples of such location pointing systems are discussed below in connection with FIG. 2. Other types of location pointing systems may be used in addition or instead.

The user interface 105 may be configured to perform other functions, including other functions that are described herein.

The wheel imbalance measuring system 101 may be configured to measure one or more imbalances in the wheel assembly. It may also be configured to generate imbalance information indicative of any measured imbalance in the wheel assembly. The information may include a quantitative assessment of an imbalance and its location. The imbalance information may be based in part on information received through the user interface 105, such as information indicative of the diameter of the wheel assembly and the separation distance between its inner and outer rims.

Examples of subcomponents that may be used as part of the wheel imbalance measuring system 101 are discussed below in connection with FIG. 2. The wheel imbalance measuring system 101 may include additional subcomponents or be comprised of different subcomponents. The wheel imbalance measuring system 101 may also be configured to perform other functions, including the functions described below.

The memory system 109 may be configured to store and recall imbalance information. The nature and format of this information may vary. It may be raw imbalance information that is generated by the wheel imbalance measuring system 101. It may in addition or instead be calculated information, such as information indicating the amount and placement location of one or more weights that may be needed to correct for an imbalance that has been measured. The memory system 109 may be configured to store other types of information and to perform other functions, including functions described below.

The memory system 109 may contain any subcomponent or subcomponents. For example, it may include volatile memory, such as one or more RAMs. It may in addition or instead include non-volatile memory, such as one or more hard disks, flash memory cards, or other memory devices. The memory system 109 may be a single component or multiple components at a single location or at various locations.

The processing system 103 may be configured to control the wheel imbalance measuring system 101 so as to partially or fully automate measuring of wheel imbalances by the wheel imbalance measuring system 101.

The processing system 103 may be configured to calculate weight information about the amount and location of one or more corrective weights that may be needed to correct for one or more measured imbalances. The processing system 103 may be configured to calculate weight information for only one plane of the wheel, for two planes, or for any number of planes. The processing system 103 may be configured to round off any calculation that is made to an amount that is representative of a weight that is commonly available.

The processing system 103 may be of any composition. It may include any combination of hardware and/or software. The processing system 103 may be at a single location or distributed across multiple locations. It may be a dedicated computer system or a general purpose computer system programmed to perform the functions describe herein.

Figure 2:
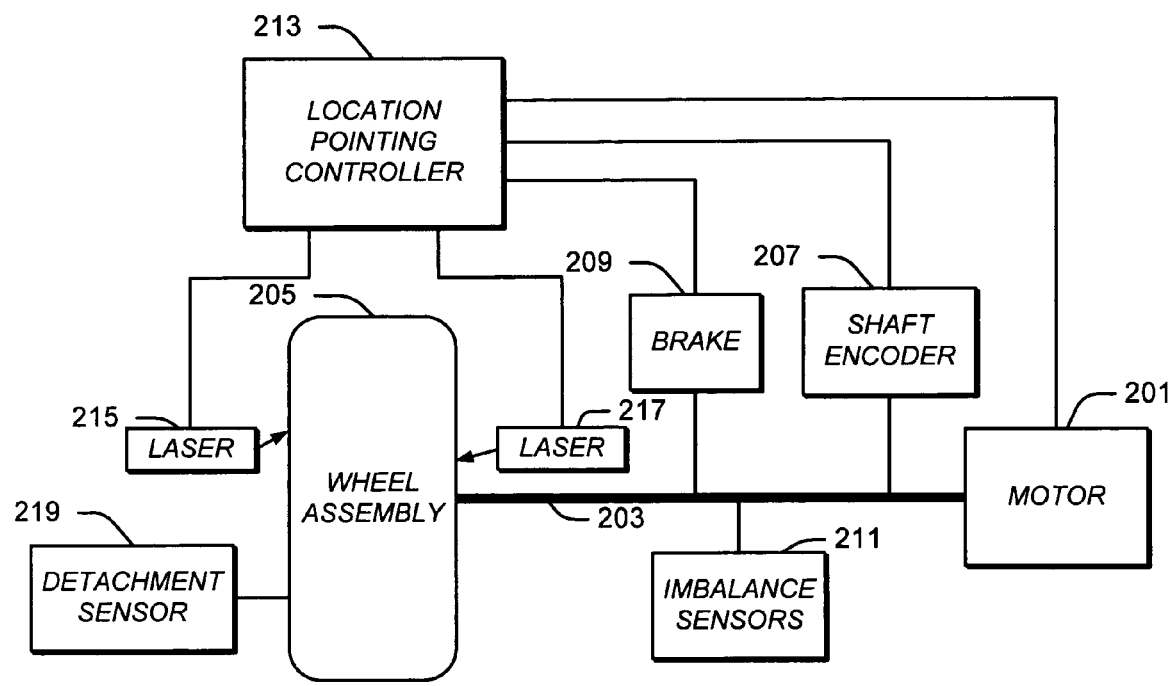
FIG. 2 is a block diagram of illustrative sub-components of components shown in FIG. 1, along with a mounted wheel assembly.

FIG. 2 is a block diagram of illustrative sub-components of components shown in FIG. 1, along with a mounted wheel assembly.

The wheel imbalance measuring system 101 may include a motor 201 that is coupled through a shaft 203 to a wheel assembly 205. It may also include a shaft encoder 207, a brake 209, and one or more imbalance sensors, such as imbalance sensors 211.

The wheel assembly 205 may be any type of wheel assembly, such as a tire mounted on a rim. The rim may have an interior portion and an exterior portion. It may or may not have a hub.

This wheel assembly may be coupled to the shaft 203. Any means may be used to accomplish this. For example, the coupling may be accomplished using a wheel clamp and/or cones, collets, or finger plates.

The motor 201 may be of any type. For example, it may be an AC motor or a DC motor, or any combination of motors. The motor 201 may be used to rotate the shaft 203 so as to cause the wheel assembly 205 to rotate while an imbalance measurement is being taken. The motor 201 may operate under the control of the wheel imbalance measuring system 101 and/or the processing system 103 while the imbalance is being measured.

The imbalance sensors 211 may be configured to detect an imbalance in the rotating wheel assembly 205. The imbalance sensors 211 may be coupled to the shaft 203 and otherwise configured to detect lateral movement of the shaft, or forces acting on the shaft that may be caused by one or more imbalances in the wheel assembly 205 while the wheel assembly 205 is rotated. When more than a single imbalance sensor is used, the imbalance sensors 211 may be positioned to monitor different longitudinal positions on the shaft 203. The imbalance sensors 211 may be of any type, such as piezoelectric sensors.

The shaft encoder 207 may be coupled to the shaft 203 and configured to decode the angular position of the shaft 203. Any type of device may be used for the shaft encoder 207, such as an LED emitter and receiver used in conjunction with a perforated disc, a reflective band with slots, or a black and white striped band.

The brake 209 may be any type of brake. It may be configured to apply friction to the shaft 203 or to a disk or drum that is attached to the shaft 203 so as to slow and ultimately stop rotation of the shaft 203. The brake 209 may be controlled by the wheel imbalance measuring system 101 and/or the processing system 103. Alternatively, the motor itself may be used to brake the shaft.

The location pointing system 107 may include a location pointing controller 213, one or more lasers, such as lasers 215 and 217, the motor 201, the shaft encoder 207, and the brake 209.

The location pointing controller 213 may be configured to cause cooperation among the components to which it is coupled so as to assist the user in locating one or more points on the wheel assembly at which one or more weights should be installed to balance the wheel assembly. Different types of location pointing assistance may be provided by the same or different embodiments of the location pointing system 107. Two types are now described.

In one embodiment, the location pointing controller 213 may cooperate with the components to which it is coupled to cause one or more light beams or mechanical pointers to point to one or more points on the wheel assembly 205 at which one or more weights should, be installed to balance the wheel assembly. In one embodiment, the location pointing controller 213 may cause the laser 215 and/or the laser 217 to direct a laser beam on the point or points on the wheel assembly 205 at which the one or more weights should be installed. The location pointing controller 213 may determine the needed directional information for the pointer or pointers based on weight placement location information received from the wheel imbalance measuring system 101 and/or the processing system 103, along with angular position information received from the shaft encoder 207 indicating the current angular position of the wheel assembly 205. The lasers 215 and 217 may include appropriate beam-directing apparatus. For example, the position of each laser may be controlled by a stepping motor and monitored by a CCD camera under the control of appropriate hardware and software to direct the beam of the laser to the appropriate spot. The location pointing controller 213 may actuate the brake 209 to prevent the wheel assembly 205 from rotating during this process.

In an alternate embodiment, the wheel balancing system may include a fixed point of reference, such as the top, bottom or mid-section of the wheel. The location pointing controller 213 may be configured to provide feedback information that signals when the wheel assembly 205 has been rotated to a position that causes a placement location on the wheel assembly 205 at which a weight should be installed to become aligned with the fixed point of reference. The location pointing controller 213 may determine the angular position based on weight placement location information received from the wheel imbalance measuring system 101 and/or the processing system 103, along with angular position information received from the shaft encoder 207.

The wheel balancing system may include a mechanical or optical pointer that fixedly points to the fixed point of reference. The location of this fixed point of reference may in addition or instead be communicated to the user, such as in an instruction manual or with a sign or label on the wheel balancing system.

The location pointing controller 213 may provide feedback to the user through the user interface 105 that tells the user when the wheel assembly has been rotated to a point that causes the a weight placement location to align with the fixed point of reference. The location pointing controller 213 may be configured to cause the user interface 105 to also alert the user when the weight placement location is approaching the fixed point of reference. This may enable the user to reduce the rotational speed of the wheel assembly 205 so that the user can stop the rotation when the weight placement location aligns with the fixed point of reference. In one embodiment, for example, different colored lights on the user interface 105 may be sequentially activated. For example, a red light may be activated when a weight placement location is within about 45° of the fixed point of reference, a yellow light when it is within about 5°, and a green light when it is within about 1°.

The location pointing controller 213 may direct the brake 209 to stop the wheel assembly 205 from rotating when the weight placement location aligns with the fixed point of reference. The location pointing controller 213 may also direct the motor 201 to cause the wheel assembly 205 to rotate into this position, thus entirely relieving the user of the need to manually rotate the wheel assembly 205.

A detachment sensor 219 may be configured to determine when the wheel assembly 205 is detached from the shaft 203. Any type of sensor may be used for the detachment sensor 219, such as a mechanical sense switch or an optical sensing system. One purpose for the detachment sensor 219 will be described below in connection with FIG. 3.

Figure 3:
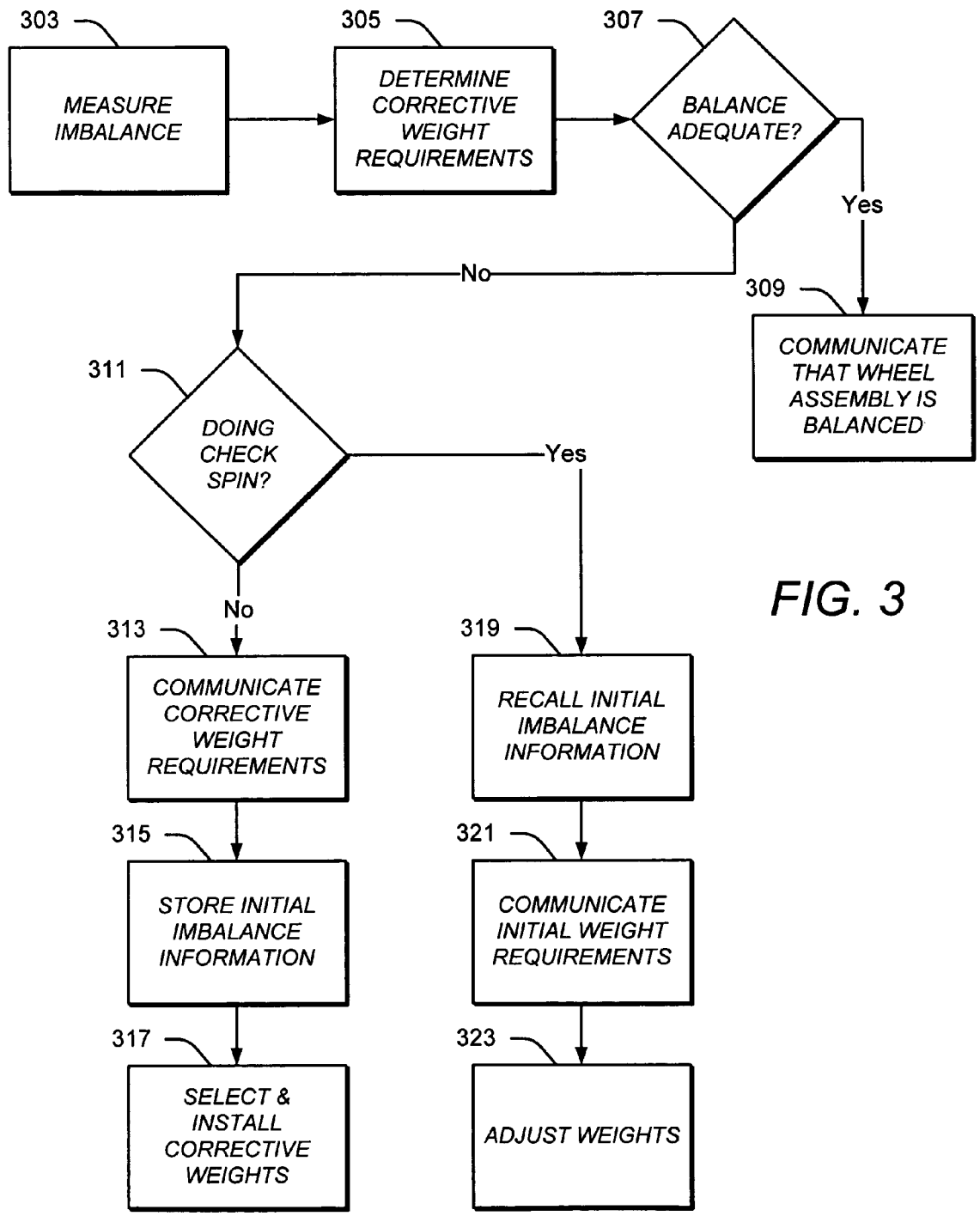
FIG. 3 is a flow diagram of a method for balancing a wheel assembly.

FIG. 3 is a flow diagram of a method for balancing a wheel assembly. The method may be performed with one or more of the components and subcomponents that are shown in FIGS. 1 and 2 and described above or with a different set of components and subcomponents. Conversely, the components and subcomponents that are shown in FIGS. 1 and 2 and described above may be employed to perform different methods than the one shown in FIG. 3.

As shown in FIG. 3, an imbalance in a wheel assembly may be measured, as reflected in a Measure Imbalance step 303.

Any means and steps may be employed to measure the imbalance. In one embodiment, the wheel assembly 205 may be coupled to the shaft 203 of the wheel imbalance measuring system 101, as shown in FIG. 2.

Information about the wheel assembly may then be received through the user interface 105, such as information about the location of planes in which corrective weights may be placed, as well as information concerning the diameter of the rim. Any components, subcomponents and techniques may be used for this purpose, such as the components, subcomponents and techniques discussed above in connection with FIGS. 1 and 2.

One or more imbalances in the wheel assembly may then be measured. Any components, subcomponents and techniques may be used to make this measurement, such as any of the components, subcomponents and techniques that are discussed above in connection with FIGS. 1 and 2.

Based on the measurements that are taken, as well as the information about the wheel assembly 205 that has been received, one or more requirements for one or more corrective weights may be determined, as reflected by a Determine Corrective Weight Requirements step 305. This determination may include a determination of a weight and placement location for one or more corrective weights. The location or locations may be limited to a single plane, such as the interior or exterior rim of the wheel hub, or they may be in multiple planes, such as on both the interior and exterior plane of the wheel hub. The amount of the weight may be expressed in any way, such as in grams or ounces. Similarly, the placement location of each weight may be expressed in any way, such as in degrees and/or by a coordinate.

A determination may next be made as to whether the degree of correction that may be required is greater than one or more predetermined thresholds, as reflected by a Balance Adequate? decision step 307. All or portions of the corrective weight requirements may be compared against one or more thresholds when making this determination. In one embodiment, for example, the determined amount for a weight may be compared to a threshold amount, such as 0.25 ounces. If less than or only the threshold weight is required, this may be deemed to be an indication that the balance is adequate.

If the Balance Adequate? decision step 307 results in a determination that the wheel assembly is sufficiently balanced, a communication to this effect may be provided to the user through the user interface 105, as reflected by a Communicate That Wheel Assembly Is Balanced step 309.

On the other hand, if the Balance Adequate? decision step 307 yields a determination that the wheel assembly is not sufficiently balanced, a determination may be made as to whether the detected imbalance is a residual imbalance of a wheel assembly that was thought to already have been balanced or whether it is an initial imbalance of a wheel assembly that has not yet been balanced. This is reflected by a Doing Check Spin? decision step 311.

Any means may be employed to determine whether the detected imbalance is of an unbalanced wheel assembly or a wheel assembly that was thought to have been balanced. In one embodiment, the processing system 103 may monitor a history of information from the detachment sensor 219 and compare it to a history of the balancing measurements that have been made. For example, a comparison of the two histories may reveal that the detachment sensor 219 was activated after the previous imbalance measurement. This may mean that a new wheel assembly 205 was placed on the shaft 203 after the previous imbalance measurement was made. The processing system 103 may be configured to interpret such a sequence of events as meaning that the wheel assembly 205 that has just been measured has not been balanced and thus that the current measurement is to determine an initial imbalance, not a residual imbalance. In other words, the processing system 103 may conclude in this circumstance that a check spin is not being performed.

On the other hand, a comparison of the histories from the detachment sensor 219 and the wheel imbalance measuring system 101 may reveal that the detachment sensor 219 was not activated following the previous imbalance measurement. The processing system 103 may be configured to interpret such a history to mean that the imbalance that was just measured represents a residual imbalance on a wheel assembly that was thought to have already been balanced. In other words, the processing system 103 may conclude that a check spin is being performed.

Other means may be employed in addition or instead for determining whether the current scan is a check spin. For example, the processing system 103 may be configured to cause the user interface 105 to ask the operator whether a check spin is being performed. The operator may enter an answer in the user interface 105 and the processing system 103 may use this answer as the basis for determining whether the current scan is a check spin.

If the current scan is not a check spin, information about one or more needed corrective weights may be communicated to the user, as reflected by a Communicate Corrective Weight Requirements step 313. The information that is communicated may include information about the amount of one or more needed weights, as well as about their location. The information may be communicated by any means through the user interface 105. For example, it may be communicated through one or more numerical displays. It may also be communicated through the use of the location pointing system 107. For example, the location pointing system 107 may cause one or more of the placement locations to be pointed out to the user, such as through the use of the laser 215 and/or the laser 217, all as described above in more detail in connection with the discussion of FIG. 2.

The processing system 103 may cause initial imbalance information to be stored in the memory system 109, as reflected by a Store Initial Imbalance Information step 315. The information that is stored may be any type of imbalance information, such as any of the types of imbalance information discussed above in connection with FIG. 1 and the memory system 109.

The operator may select and install a corrective weight or weights in conformance with the communicated corrective weight requirements, as reflected by a Select and Install Corrective Weights step 317. Any types of weights may be selected and installed, such as weights that attach to the rim through adhesion and/or clamping.

After installing the corrective weights, the operator may again measure the imbalance to verify that the wheel assembly is sufficiently balanced. This operation may include a repetition of the Measure Imbalance step 303, the Determine Corrective Weight Requirements step 305, and the Balance Adequate? decision step 307. If the residual imbalance measurement does not exceed the threshold or thresholds discussed above, the operator may be told that the wheel assembly is adequately balanced, as reflected by the Communicate That Wheel Assembly Is Balanced step 309.

If the residual imbalance measurement exceeds the threshold or thresholds, on the other hand, the Doing Check Spin? decision step 311 may transfer control to a Recall Initial Imbalance Information step 319. During this step, the processing system 103 may cause the initial imbalance information that was previously stored in the memory system 109 pursuant to the Store Initial Imbalance Information step 315 to be recalled. This recalled information may be communicated to the user through the user interface 105, as reflected by a Communicate Initial Weight Requirements step 321. During this step, the user may again be told about the initial weight requirements, not the requirements of additional weights that might be added to compensate for the current residual imbalance.

The Communicate Initial Weight Requirements step 321 may be implemented with any of the components, subcomponents and steps that have been discussed above in connection with the Communicate Corrective Weight Requirements step 313. For example, the initial weight requirements may be communicated to the user through the use of the location pointing system 107. For example, the location pointing controller 213 may cause the laser 215 and/or the laser 215 to direct a beam to the placement location at which the currently-installed weight or weights should have been attached. The Communicate Initial Weight Requirements step 321 may in addition or instead again communicate to the operator the amount of the weight or weights. The information that is communicated to the operator during the Communicate Initial Weight Requirements step 321 may be based upon the initial imbalance information that is recalled from the memory system 109 during the Recall Initial Imbalance Information step 319.

The operator may compare the current location of the weight or weights with the specified location or locations. The operator may in addition or instead compare the current amount of the weight or weights with the specified amount of the weight or weights. The operator may adjust the location and/or amount of the weight or weights to eliminate or substantially eliminate the residual imbalance, as reflected in an Adjust Weights step 323.

In one embodiment, for example, the operator may compare the location at which a spot from the beam from the laser 215 appears on the rim with the actual location of the weight that the operator installed. If the two are different, the operator may adjust the location of the weight to eliminate or to at least substantially reduce the difference.

Similarly, the operator may compare the amount of a weight that was installed to the specified amount. If the two are different, the operator may remove the weight that had been installed and replace it with the correct weight.

After adjusting the weights, the operator may again check the balance of the wheel assembly by proceeding through the same process, beginning with the Measure Imbalance step 303. Further adjustments may be made if the balance is still not adequate, all in accordance with the methods and using the components and subcomponents that have been described.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The term "coupled" encompasses both direct and indirect coupling. For example, the term "coupled" encompasses the presence of intervening circuitry between two points that are coupled The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage, or equivalent to the public, regardless of whether it is recited in the claims.

What is claimed is:

1. A wheel balancing system comprising a wheel imbalance measuring system, a memory system, a user interface, and a processing system configured to:
   cause initial imbalance information relating to an initial imbalance of a wheel assembly that was measured by the wheel imbalance measuring system to be stored in the memory system; and
      if and only if a check spin is being performed: recall the initial imbalance information from the memory system after a residual imbalance measurement of the wheel assembly by the wheel imbalance measuring system subsequent to the initial imbalance measurement; and
   cause the user interface to communicate weight information to the user about an amount and placement location of at least one weight needed to correct for the initial imbalance based on the initial imbalance information recalled from the memory system after the residual imbalance measurement of the wheel assembly by the wheel imbalance measuring system subsequent to the initial imbalance measurement.

2. The wheel balancing system of claim 1 wherein the user interface includes a location system configured to aid the user in locating the placement location on the wheel assembly.

3. The wheel balancing system of claim 2 wherein the location system includes a light-emitting device.

4. The wheel balancing system of claim 2 wherein the location system includes a shaft encoder configured to measure the angular position of the wheel assembly while coupled to the wheel imbalance measuring system.

5. The wheel balancing system of claim 4 wherein the location system includes a pointing device and is configured to cause the pointing device to point to the placement location on the wheel assembly based in part on information from the shaft encoder.

6. The wheel balancing system of claim 4 wherein the location system is configured to determine when the wheel assembly has been rotated to a position at which the placement location of the needed weight is aligned with a fixed reference point based on information from the shaft encoder.

7. The wheel balancing system of claim 6 further comprising a controllable brake configured to controllably stop the wheel assembly from rotating and wherein the location system is configured to cause the controllable brake to stop the wheel assembly from rotating when the wheel assembly has been rotated to a position at which the placement location of the needed weight is aligned with the fixed reference point.

8. The wheel balancing system of claim 6 further comprising a motor and wherein the location system is configured to cause the motor to rotate the wheel assembly to a position at which the placement location of the needed weight is aligned with the fixed reference point.

9. The wheel balancing system of claim 1 wherein the processing system is configured to compare at least a portion of residual imbalance information measured during the residual imbalance measurement to a threshold value.

10. The wheel balancing system of claim 1 wherein the weight information relates to the amount and placement location of the weight in a first plane and wherein the processing system is configured to cause the user interface to communicate second weight information to the user about the weight and placement location of a second weight needed to correct for the imbalance in a second plane different from the first plane.

11. A wheel balancing system comprising a wheel imbalance measuring system, a memory system, a user interface, and a processing system configured to:
   cause initial imbalance information relating to an initial imbalance of a wheel assembly that was measured by the wheel imbalance measuring system to be stored in the memory system;
   recall the initial imbalance information from the memory system after a residual imbalance measurement of the wheel assembly by the wheel imbalance measuring system subsequent to the initial imbalance measurement;
   cause the user interface to communicate weight information to the user about an amount and placement location of at least one weight needed to correct for the initial imbalance based on the initial imbalance information recalled from the memory system after the residual imbalance measurement of the wheel assembly by the wheel imbalance measuring system subsequent to the initial imbalance measurement; and
   further comprising a detachment sensor configured to sense when the wheel assembly is detached from the wheel imbalance measuring system and wherein the processing system is configured to determine whether the wheel assembly has been detached from the wheel imbalance measuring system between the initial and residual imbalance measurements based on information from the detachment sensor.

12. A wheel balancing system comprising a wheel imbalance measuring system, a memory system, a user interface, and a processing system configured to:
   cause initial imbalance information relating to an initial imbalance of a wheel assembly that was measured by the wheel imbalance measuring system to be stored in the memory system;
   recall the initial imbalance information from the memory system after a residual imbalance measurement of the wheel assembly by the wheel imbalance measuring system subsequent to the initial imbalance measurement;

cause the user interface to communicate weight information to the user about an amount and placement location of at least one weight needed to correct for the initial imbalance based on the initial imbalance information recalled from the memory system after the residual imbalance measurement of the wheel assembly by the wheel imbalance measuring system subsequent to the initial imbalance measurement, wherein the processing system is configured to compare at least a portion of residual imbalance information measured during the residual imbalance measurement to a threshold value, and wherein the processing system is configured to cause the user interface to communicate the weight information to the user if at least a portion of the residual imbalance information is greater than the threshold value, but not if it is less than the threshold value.

13. A wheel balancing system comprising a wheel imbalance measuring system and a processing system configured to, if and only if a check spin is being performed, cause a user interface to communicate information to a user about an amount and placement location of at least one weight needed to correct for an imbalance measured during an initial imbalance measurement of a wheel assembly by the wheel imbalance measuring system after a residual imbalance measurement of the wheel assembly by the wheel imbalance measuring system.

14. The wheel balancing system of claim 13 further comprising a location system configured to aid the user in locating the placement location on the wheel assembly.

15. A wheel balancing system comprising a wheel imbalance measuring system and a processing system configured to cause a user interface to communicate information to a user about an amount and placement location of at least one weight needed to correct for an imbalance measured during an initial imbalance measurement of a wheel assembly by the wheel imbalance measuring system after a residual imbalance measurement of the wheel assembly by the wheel imbalance measuring system, wherein the processing system is configured to determine whether the wheel assembly has been detached from a wheel imbalance measuring system between the initial and residual imbalance measurements, further comprising a detachment sensor configured to sense when the wheel assembly is detached from the wheel imbalance measuring system.

16. A wheel balancing process comprising, if and only if a check spin is being performed, communicating information to a user through a user interface about an amount and placement location of at least one weight needed to correct for an imbalance measured during an initial imbalance measurement of a wheel assembly by a wheel imbalance measuring system after a residual imbalance measurement of the wheel assembly by the wheel imbalance measuring system.

17. A wheel balancing process comprising:
measuring an initial wheel imbalance of the wheel using a wheel imbalance measuring system;
storing initial imbalance information about the initial wheel imbalance in a memory system;
communicating to a user an amount and placement location of at least one weight needed to correct for the initial imbalance based on the initial imbalance information;
adding one or more weights to the wheel;
measuring a residual wheel imbalance of the wheel using the wheel imbalance measuring system after the weights are added;
communicating to the user the amount and placement location of the at least one weight needed to correct for the initial imbalance based on the initial imbalance information; and
adjusting the amount and/or placement of at least one weight on the wheel to conform to the communicated amount and placement location of the at least one weight.

* * * * *